Nov. 30, 1954  J. M. DORTON  2,695,692
POWER TRANSMISSION AND BRAKE UNIT FOR VEHICLES
Filed Dec. 12, 1952

INVENTOR.
John M. Dorton
BY
Hamilton + Hamilton
Attorneys.

United States Patent Office 2,695,692
Patented Nov. 30, 1954

2,695,692

POWER TRANSMISSION AND BRAKE UNIT FOR VEHICLES

John M. Dorton, Bonner Springs, Kans.

Application December 12, 1952, Serial No. 325,659

2 Claims. (Cl. 192—8)

This invention relates to new and useful improvements in combined power transmission and brake units, and has particular reference to such a unit adapted to be used in a self-propelled vehicle. Specifically, the unit is intended for use in a motor driven invalid's chair, although its use is not so limited.

The principal object of this invention is the provision of a power transmission and brake unit of the class described so constructed that whenever the power supply thereto is turned off, the brakes are applied automatically to bring the vehicle to a stop. This arrangement is obviously valuable as a safety feature, particularly when the vehicle is an invalid's chair and the person using it is incapacitated or subject to seizures.

Another object is the provision, in a device of the character described including means for simultaneously disengaging the brakes and power transmission means from the vehicle wheels, thereby permitting the use of the vehicle (invalid's chair) as an ordinary wheelchair.

Other objects are simplicity and economy of construction, efficiency and dependability of operation, and adaptability for use in a wide variety of applications.

With these objects in view, as well as other objects which will appear in the course of the specification, reference will be had to the drawing, wherein.

Figure 1:
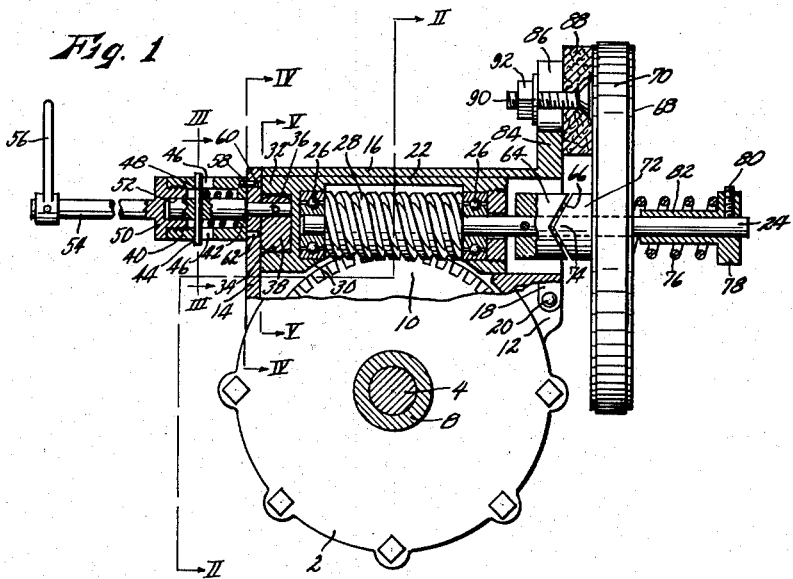
Fig. 1 is a side elevation, partially in section, of a power transmission and brake unit embodying the present invention.

Like reference numerals apply to similar parts throughout the several views, and the numeral 2 applies to a substantially cylindrical gear housing. Two coaxial axles 4 and 6, at the outer ends of which the ground engaging wheels (not shown) of the vehicle are mounted, extend axially into said housing, said axles being carried rotatably in axle housings 8 fixed to gear housing 2. Axles 4 and 6 may be designated the power output shafts of the transmission unit. The gear housing is fixedly mounted in the vehicle by any suitable means, not shown. Within housing 2, axles 4 and 6 are connected to a worm gear 10. Usually said connection will be through a standard set of differential gearing, not shown, carried in housing 2, said gearing being common in the driving axles of automotive vehicles, and there being no need for detailing the same here. Worm gear 10 constitutes the ring gear of the differential gearing. However, axles 4 and 6 could be integral and worm gear 10 rigidly attached thereto, and still fall within the scope of this invention, which requires only that there be a driving connection between gear 10 and axles 4 and 6.

Figure 2:
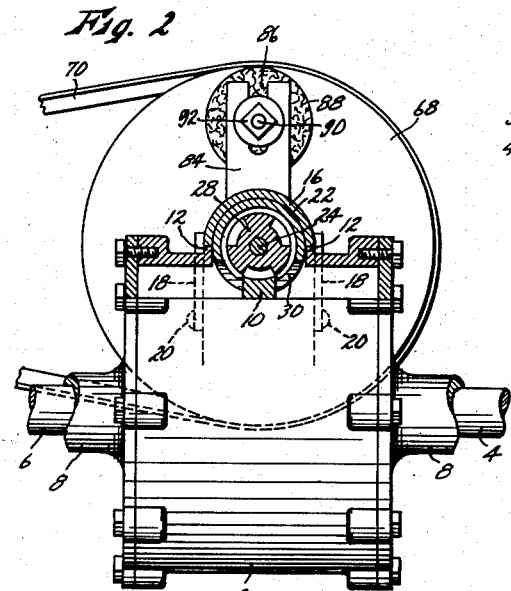
Fig. 2 is a fragmentary section taken on line II—II of Fig. 1.
Figure 5:
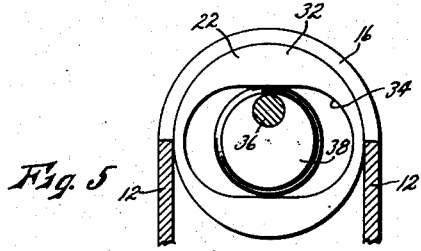
Fig. 5 is an enlarged fragmentary section taken on line V—V of Fig. 1.

The peripheral wall of housing 2 has an opening 75 formed therein at the top of the housing, said opening being bounded at its sides by vertical side walls 12 disposed at right angles to axles 4 and 6, said side walls being integral with housing 2 and extending thereabove, the upper edges thereof lying in a horizontal plane, and by an end wall 14 integral with housing 2 and extending above side walls 12. A hollow, semi-cylindrical carriage 16 is arranged above housing 2 and extends at right angles to axles 4 and 6, the edges thereof normally lying in registry with the upper edges of side walls 12, as shown in Figs. 2 and 5. One end of said carriage normally lies in abutting relation with end wall 14. At its opposite end, said carriage has a pair of arms 18 fixed thereto and extending downwardly therefrom, said arms being secured pivotally at their lower ends to side walls 12 at 20, said pivot being parallel to axles 4 and 6.

Rigidly welded or otherwise securely fixed within carriage 16, coaxially therewith, is a substantially cylindrical worm carrier 22. A shaft 24 is rotatably mounted axially within said carrier by means of ball bearings 26, and a worm 28 is rigidly fixed axially on said shaft, said worm normally being in mesh with worm gear 10, as shown in Fig. 1. Shaft 24 may be designated the power input shaft of the transmission unit. Carrier 22 is provided with an opening 30 in the lower side thereof to permit the engagement of said worm and worm gear. It will be noted that, for purposes hereinafter appearing, worm 28 has a plurality of teeth, and has a lead angle sufficiently great to render the connection reversible. That is, the worm may be driven rotatably by turning worm gear 10, as well as vice versa. However, the reversibility is less than perfect; that is to say the lead angle of the worm is less than 45 degrees, so that a greater power is required to turn worm 28 by means of worm gear 10 than is required to turn the worm gear by means of the worm.

Figure 6:
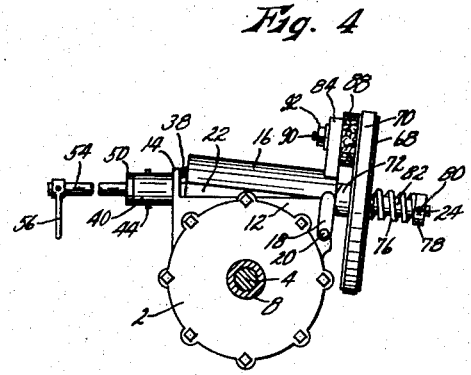
Fig. 6 is a reduced exterior side elevational view similar to Fig. 1, showing the parts in position to disengage the brake and power drive from the vehicle wheels.

At the end of carrier 22 distal from pivot 20, the left end as viewed in Fig. 1, said carrier is provided with an integral end wall 32 normally lying flush against the inner surface of end wall 14. In the outer surface of end wall 32 is formed a horizontally elongated recess 34. Journalled in end wall 14 is a horizontal shaft 36 parallel to the normal position of shaft 24. Fixed eccentrically on shaft 36 within recess 34 is a circular cam 38. It is apparent that by turning shaft 36, cam 38 may be caused to selectively tilt carrier 22 downwardly to mesh worm 28 with worm gear 10, as shown in Figs. 1 and 3, or to tilt said carrier upwardly about pivot 20 to elevate the worm out of engagement with worm gear 10, as indicated in Fig. 6.

Figure 3:
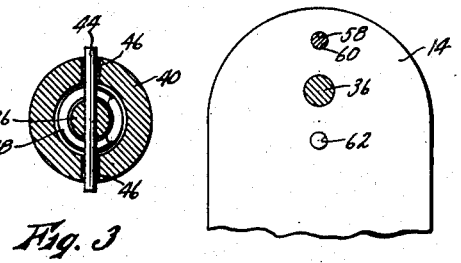
Fig. 3 is an enlarged sectional view taken on line III—III of Fig. 1.
Figure 4:
Fig. 4 is an enlarged fragmentary section taken on line IV—IV of Fig. 1.

Shaft 36 may be turned, and locked selectively in the engaging or disengaging positions, by the mechanism best shown in Figs. 1, 3 and 4, which includes a sleeve 40 of larger internal diameter than shaft 36 mounted on the outwardly extended end portion of said shaft, and having an internal flange 42 at its inner end riding slidably on said shaft. A pin 44 is fixed diametrically in said shaft, and extends through longitudinally elongated slots 46 formed in said sleeve. A helical spring 48 is disposed in the annular space between the sleeve and shaft, bearing at one end against flange 42 and at its opposite end against pin 44, thereby urging sleeve 40 toward and against end wall 14. A cap 50 is threaded in the outer end of sleeve 40, said cap having a recess 52 formed therein and receiving slidably the end portion of shaft 36. A rod 54 of any desired length is attached to cap 50, and has a handle 56 secured to the outer end thereof. Fixed in the inner end of sleeve 40, extending parallel to but spaced from shaft 36, is a pin 58 adapted to be engaged selectively in holes 60 and 62 formed therefor in end wall 14. With said pin positioned in hole 60, as shown, worm 28 is locked in engagement with worm gear 10. By pulling handle 56 axially outwardly to free pin 58 from hole 60, turning it 180 degrees and releasing it to engage the pin in hole 62, the worm is locked out of engagement with the worm gear, as indicated in Fig. 6. It will be noted that the peripheral surface of cam 38 is spherically curved in order to prevent binding thereof in recess 34 as the carriage is tilted.

Shaft 24 extends outwardly from carriage 16 oppositely from rod 54. Axially fixed on said shaft just forwardly from worm carrier 22 is a cylindrical cam 64, in the forward end of which a diametric V-groove 66 is formed, the faces of which form a double cam surface. A pulley wheel 68 is mounted on shaft 24 outwardly from cam 64 for rotary and axial sliding movement.

Said pulley is connected by belt 70 to the power unit, not shown, of the vehicle, said power unit usually being an electric motor. The belt connection is sufficiently yieldable to permit the above described tilting of carriage 16. The pulley has a cylindrical hub 72 extending toward cam 64, the end of said hub being formed to present a V-rib 74, the faces of which form a double cam surface corresponding with and engaging cam groove 66. A helical spring 76 is disposed about the outwardly extended end portion of shaft 24, bearing at one end against pulley 68 and at its opposite end against a collar 78 secured on said shaft by set screw 80. It is evident that whenever pulley 68 is turned relative to shaft 24 in either direction, cam members 64 and 72 cooperate to move the pulley outwardly on the shaft, or to the right as viewed in Fig. 1, against the pressure of spring 76. A sleeve 82 integral with collar 78 extends toward pulley 68, and terminates at a distance from said pulley less than the depth of cam groove 66. This prevents the cams from riding over each other in continuous rotation, thereby limiting the rotation of the pulley on the shaft and providing a positive driving connection therebetween. It is evident that the surfaces of cam groove 66 and rib 74 would have surface contact, and operate more efficiently, if formed in helicoidal shape rather than planar. However, the V-shape will operate satisfactorily, and serves to illustrate the principle involved.

An arm 84 is formed integrally with carriage 16, and extends upwardly therefrom radially to shaft 24, and has a slot 86 formed longitudinally therein. A brake disc 88 made of fiber or other suitable material is secured to said arm by a bolt 90 extending through slot 86 and secured by nut 92. The face of said brake disc is engaged by the inner face of pulley 68, said pulley being urged thereagainst by spring 76. The thickness of the brake disc is such as to hold the cam members 64 and 72 slightly out of total engagement, as shown in Fig. 1, thereby insuring that the cam members, when axially closest together, cannot hold the pulley out of contact with the brake disc. The braking force exerted on the pulley by the brake disc can be adjusted by moving bolt 90 in slot 86, and to some extent by loosening set screw 80 and moving collar 78 along shaft 24.

The operation of the device is substantially as follows. With the vehicle at rest, and the power unit or motor off, the parts are positioned as shown in Fig. 1. When the motor is started, it exerts a rotative force on pulley 68 through belt 70, sufficient to turn the pulley against the retarding force of brake disc 88. Shaft 24 being rendered resistant to rotation by the inertia of the vehicle, the rotation of pulley 68 thereon, in either direction, causes cam members 64 and 72 to move the pulley to the right, as viewed in Fig. 1, against the pressure of spring 76 and away from brake disc 88. When the pulley strikes the end of sleeve 82, it can move no farther, and the cams then provide a positive driving connection to shaft 24, which acts through worm 28, worm gear 10 and axles 4 and 6 to turn the vehicle wheels and drive the vehicle over the ground. As long as pulley 68 exerts sufficient torque on shaft 24 to cause cams 64 and 72 to overcome spring 76, the pulley will be held out of contact with the brake disc.

If the motor speed is reduced to reduce the speed of the vehicle, or if the power thereto is turned off completely, then spring 76 immediately forces the pulley against the brake disc. Also the worm drive is then reversed, that is worm 28 is then being driven by worm gear 10. Since the lead angle of the worm is less than 45 degrees, a greater power must be exerted thereon by the worm gear than was required to turn the worm gear by means of the worm, and the worm drive thus acts itself as a brake, reducing the work to be done by the brake disc, which is acting simultaneously to brake the rotation of shaft 24. The rotation of shaft 24 by worm 28 causes cam 64 to act on cam hub 72 to lessen the pressure of the pulley against the brake disc. However, this action can occur only until the increasing torque on the pulley is just balanced by the decreasing braking effect exerted on the pulley by the brake disc, whereupon the pulley will turn with the shaft, but still in contact with the brake disc. There is therefore a positive braking force on the pulley. Moreover, as the torque exerted on the pulley by the cams is reduced, due to the lessening momentum of the vehicle, the braking force exerted on the pulley by the brake disc will be gradually increased to the full strength of spring 76. This, in combination with the braking effect of the worm drive, is sufficient to bring the vehicle to a smooth, sure stop. The small initial braking force of the brake disc also serves to prevent too sudden application of full braking force, which would cause an objectionably rapid deceleration.

If the motor had been merely slowed to reduce the speed of the vehicle, the braking action will continue only until the speed of shaft 24 is reduced to the reduced motor speed, whereupon the pulley will again be cammed out of engagement with the brake disc. The above described braking effect occurs also when the vehicle, as on a downward slope, tends to "coast" at a speed greater than that of its power drive.

When the operator turns handle 56 as previously described to elevate worm 28 out of engagement with worm gear 10, the braking effect of both the worm drive and the brake disc is removed from the vehicle wheels, which, if it is an invalid's chair, may then be wheeled about as an ordinary wheelchair.

While I have shown and described a specific embodiment of my invention, it is apparent that many minor changes of structure and operation could be made without departing from the spirit of the invention as defined by the scope of the appended claims.

What I claim as new and desire to protect by Letters Patent is:

1. A power transmission and brake unit comprising a housing, a power output shaft carried rotatably by said housing, a first gear carried by said housing and connected to said output shaft, a carriage carried movably by said housing, a power input shaft carried rotatably by said carriage, a second gear fixed on said input shaft and normally meshed with said first gear, manual means operable to move said carriage relative to said housing whereby said second gear may be moved out of engagement with said first gear, a drive member carried for limited rotation and axial sliding movement on said input shaft and adapted to be rotatably driven, a brake disc fixed to said carriage, resilient means urging said drive member axially along said input shaft into frictional engagement with said brake disc, and cooperating cam members fixed respectively to said input shaft and said drive member, and operable during the relative rotation of said input shaft and drive member, in either direction, to urge said drive member axially along said shaft to disengage the same from said brake disc.

2. A power transmission and brake unit comprising a housing, a power output shaft carried rotatably by said housing, a worm gear operably connected to said output shaft, a carriage pivotally connected to said housing, a power input shaft carried rotatably by said carriage, a worm fixed on said input shaft and normally in engagement with said worm gear, said worm and worm gear having a lead angle sufficiently great to render the drive therebetween reversible but less than 45 degrees, manually operable means including a cam carried by said housing operable to tilt said carriage relative to said housing to move said worm out of engagement with said worm gear, a drive member carried for limited rotation and axially sliding movement on said input shaft and adapted to be rotatably driven, a brake disc fixed to said carriage, resilient means urging said drive member axially along said input shaft into frictional engagement with said brake disc, and cooperating cam members fixed respectively to said input shaft and said drive member, and operable during the relative rotation of said input shaft and drive member, in either direction, to urge said drive member axially along said shaft to disengage the same from said brake disc.

References Cited in the file of this patent

UNITED STATES PATENTS

| Number | Name | Date |
|---|---|---|
| 767,312 | Otis | Aug. 9, 1904 |
| 2,296,875 | Ritchie | Sept. 29, 1942 |

FOREIGN PATENTS

| Number | Country | Date |
|---|---|---|
| 591,325 | Great Britain | Aug. 14, 1947 |
| 519,273 | Germany | Feb. 26, 1931 |